(12) United States Patent
Yoshiuchi et al.

(10) Patent No.: US 8,374,501 B2
(45) Date of Patent: Feb. 12, 2013

(54) OPTICAL LINE TERMINAL AND OPTICAL LINE TRANSMISSION AND RECEPTION SYSTEM

(75) Inventors: Hideya Yoshiuchi, Beijing (CN); Hiroki Ikeda, Hachioji (JP); Ying Shi, Beijing (CN)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 12/620,876

(22) Filed: Nov. 18, 2009

(65) Prior Publication Data

US 2010/0129072 A1 May 27, 2010

(30) Foreign Application Priority Data

Nov. 21, 2008 (CN) .......................... 2008 1 0177912

(51) Int. Cl.
*H04B 10/08* (2006.01)
*H04B 10/06* (2006.01)
*H04J 14/00* (2006.01)

(52) U.S. Cl. ............. 398/33; 398/70; 398/208; 398/209

(58) Field of Classification Search .................... 398/33, 398/66, 67, 70–72, 208, 209
See application file for complete search history.

(56) References Cited

U.S. PATENT DOCUMENTS

| 6,715,113 | B1 | 3/2004 | Bendak et al. | |
| 7,555,228 | B2 * | 6/2009 | Ruegg et al. | 398/209 |
| 7,925,156 | B2 * | 4/2011 | Weber et al. | 398/25 |
| 7,925,164 | B2 * | 4/2011 | Sitton et al. | 398/72 |
| 8,041,217 | B2 * | 10/2011 | Bouda | 398/75 |
| 8,116,627 | B2 * | 2/2012 | Ikeda et al. | 398/66 |
| 2007/0264031 | A1 | 11/2007 | Dalton | |
| 2011/0255866 | A1 * | 10/2011 | Van Veen et al. | 398/35 |

* cited by examiner

*Primary Examiner* — Dalzid Singh
(74) *Attorney, Agent, or Firm* — Antonelli, Terry, Stout & Kraus, LLP.

(57) ABSTRACT

An optical line terminal includes an optical network interface having an optical receiver unit to convert an optical signal received from an optical network unit into an electrical signal and output a direct current bias monitoring signal and an error code detector to detect an error code in the electrical signal to output an error code indication signal, a storage to store therein a direct current bias table indicating a direct current bias corresponding to a direct current bias control parameter of the optical network units and a dynamic band allocation information table indicating communication time slot information allotted to each optical network unit and a control unit to receive the direct current bias monitoring signal and the error code indication signal and supply the direct current bias control signal to the optical receiver unit to thereby form one feedback circuit together with the optical network interface.

10 Claims, 16 Drawing Sheets

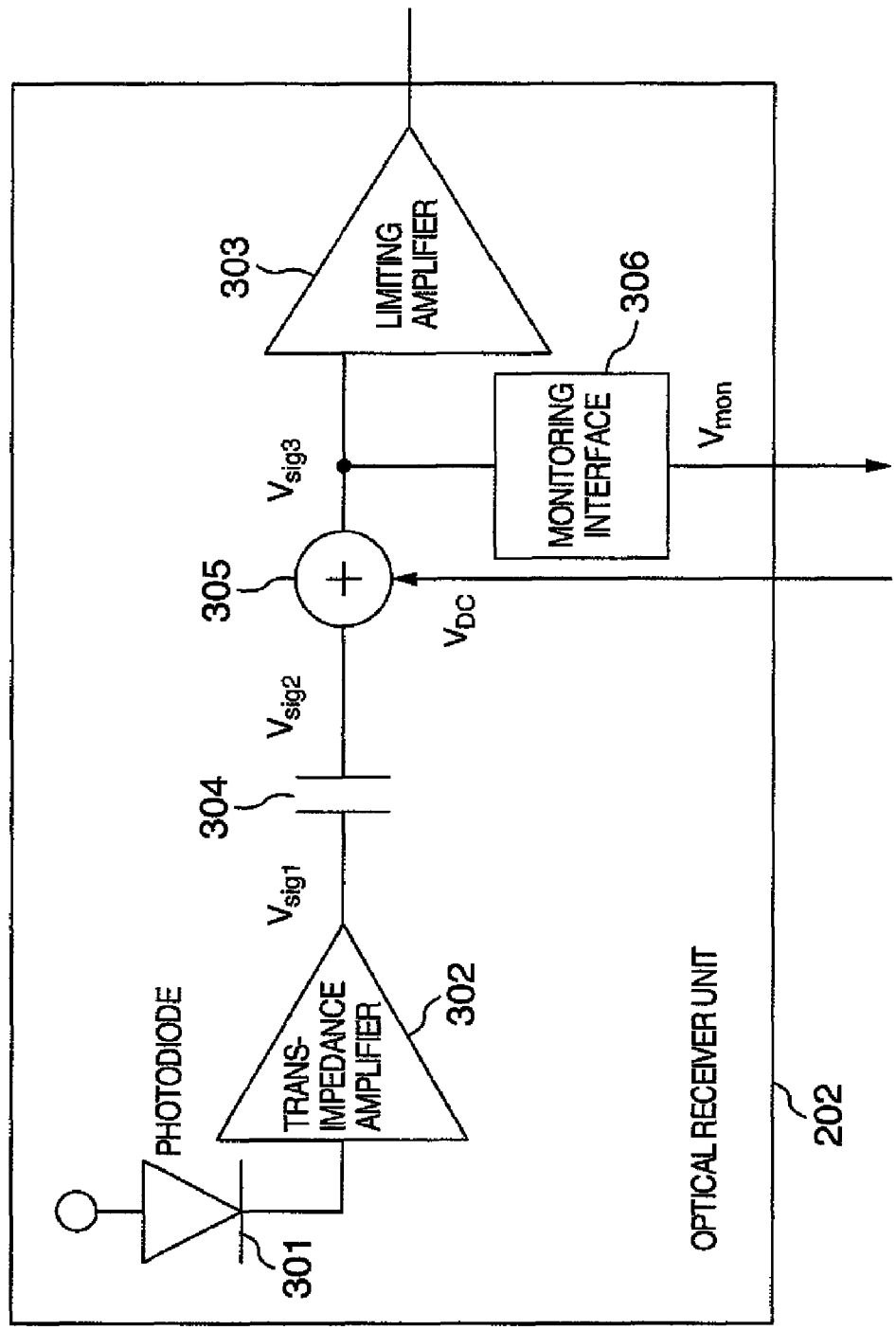

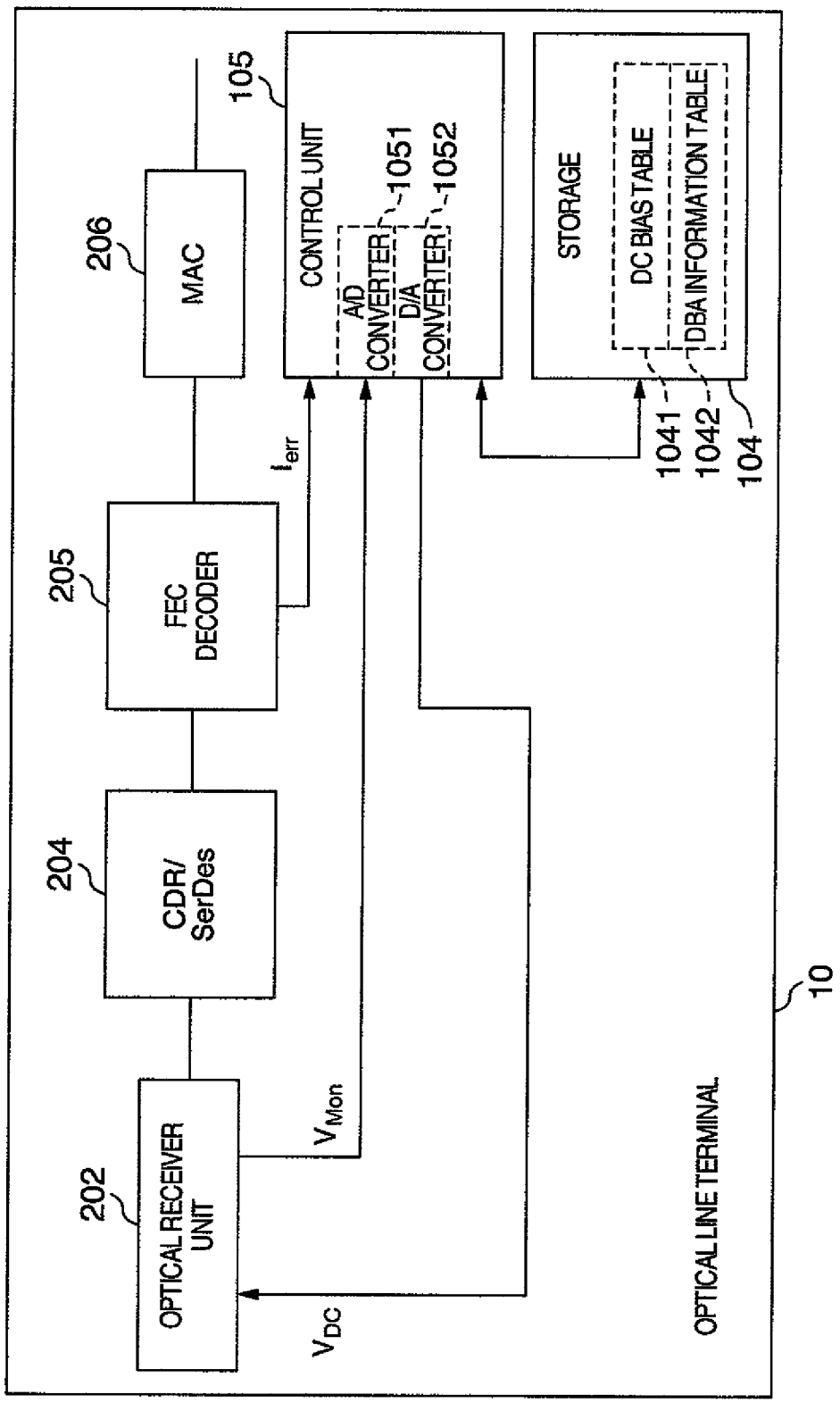

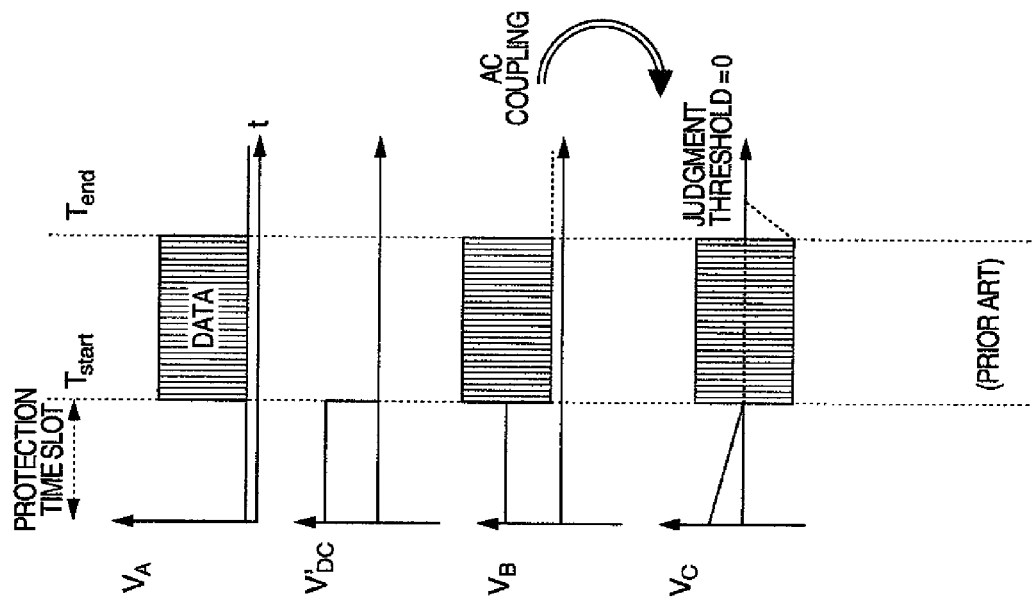
FIG.5F FIG.5G FIG.5H FIG.5I (PRIOR ART)
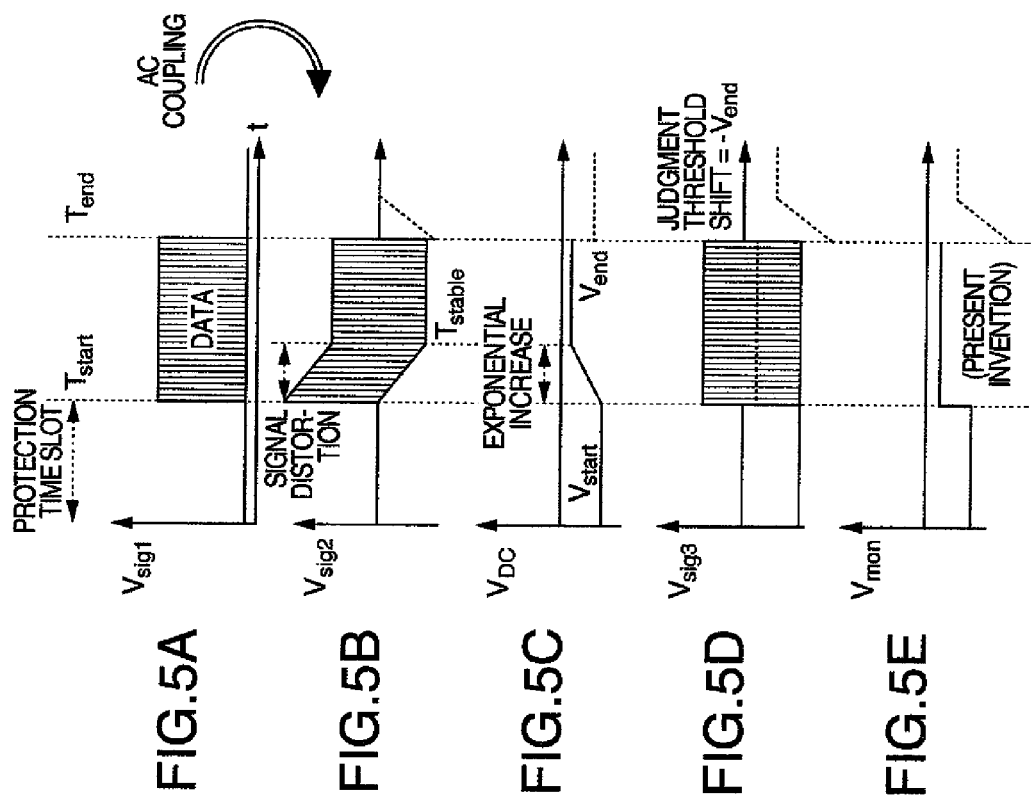
FIG.5A FIG.5B FIG.5C FIG.5D FIG.5E (PRESENT INVENTION)

(PRESENT INVENTION)

FIG. 6A

DC BIAS TABLE

| LLID | PARAMETER |
|---|---|
| LLID 1 | {$V_{start}1, V_{end}1, t_c1, N_{err}1, T_{err}1$} |
| LLID 2 | {$V_{start}2, V_{end}2, t_c2, N_{err}2, T_{err}2$} |

FIG. 6B

DBA INFORMATION TABLE

| LLID | PARAMETER |
|---|---|
| LLID 1 | {$T_{start}1, T_{end}1$} |
| LLID 2 | {$T_{start}2, T_{end}2$} |

(PRIOR ART)

FIG. 6C

PARAMETER LOOKUP TABLE

| POWER X | POWER Y | PARAMETER |
|---|---|---|
| -20dBm | -10dBm | {P1, P2,...} |
| -21dBm | -10dBm | {P1', P2',...} |

FIG. 6D

OPTICAL NETWORK UNIT RSSI TABLE

| ONU | PARAMETER |
|---|---|
| ONU1 | Power1 |
| ONU2 | Power2 |

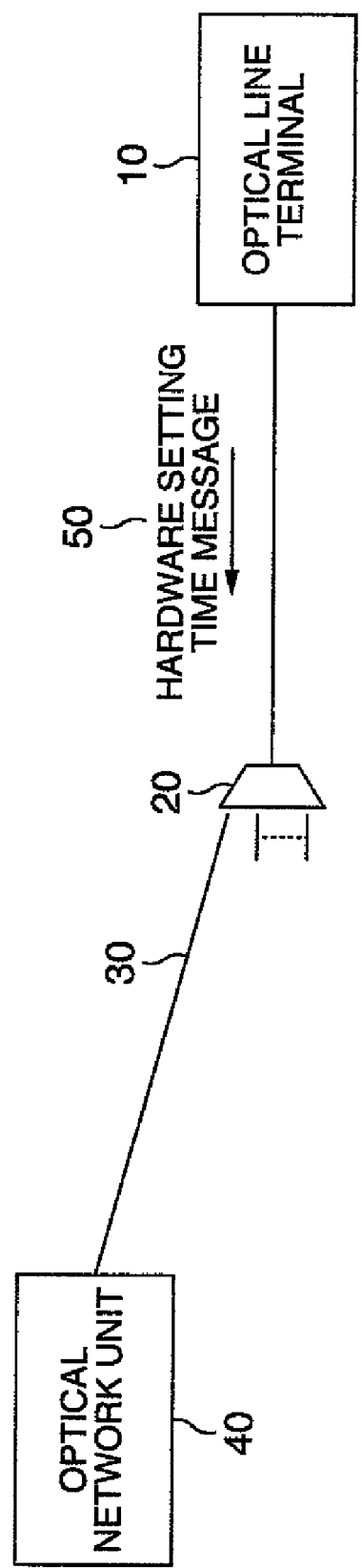

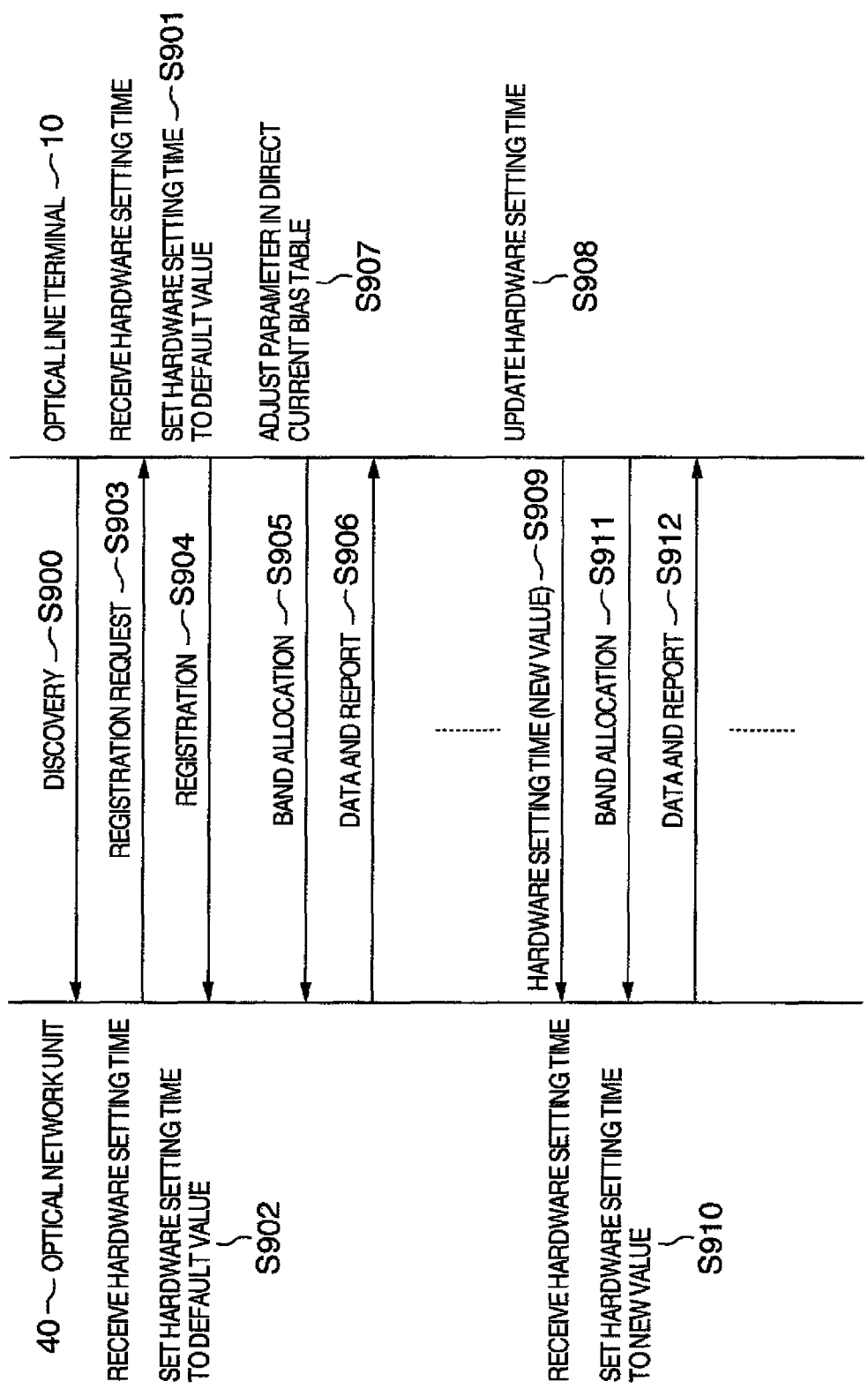

FIG.16D

OPTICAL LINE TERMINAL AND OPTICAL LINE TRANSMISSION AND RECEPTION SYSTEM

INCORPORATION BY REFERENCE

The present application claims priority from Japanese application CN-P200810177912.0 filed on Nov. 21, 2008, the content of which is hereby incorporated by reference into this application.

BACKGROUND OF THE INVENTION

The present invention relates to an optical line terminal and an optical line transmission and reception system and more particularly to an optical line terminal and an optical line transmission and reception system adopting a burst-mode optical receiver unit for optimization of a direct current bias of an amplifier.

In the passive optical network (PON), a plurality of optical network units (ONU) are connected to an optical line terminal (OLT) through tree-type topology links and share up bandwidth in the time-multiplexed manner. The optical line terminal utilizes the fixed bandwidth allocation or the dynamic bandwidth allocation (DBA) to allot time slots to the respective optical network units. The optical network unit transmits burst data packets to the optical line terminal in the time slot allotted thereto and an optical receiver unit of the optical line terminal receives the burst data packets transmitted from different optical network unit.

Since the magnitude of power of the burst data packet transmitted from the different optical network unit to the optical line terminal is different, the optical receiver unit of the optical line terminal adjusts a judgment threshold of a limiting amplifier on the basis of the power to perform limitation amplification when the optical receiver unit receives the burst data packet, so that a digital signal is judged exactly. Alternatively, the optical receiver unit of the optical line terminal adjusts a direct current bias for an input signal of the limiting amplifier to attain the same effect as the adjustment of the judgment threshold of the limiting amplifier, so that the judgment of the digital signal can be made exactly. However, a continuous model amplifier in the prior art generally uses AC coupling at an input terminal and signals are distorted during the charging and discharging process of a coupling capacitor therefor, so that relatively long hardware setting time must be used to adjust the judgment threshold of the amplifier. However, in the burst model, such adjustment must be made each time one burst data packet is received and accordingly the utilization factor of the bandwidth is reduced.

On the other hand, the limiting amplifier using AC coupling in the prior art usually employs an automatic bias feedback control circuit to stabilize the judgment threshold of the amplifier to a zero voltage level. Particularly, the cause such as saturation in the leading edge of photoelectric conversion due to excessive input signal power often generated in the burst model subjects the signal transmitted to the limiting amplifier to waveform distortion of different kind. The optimum reception judgment threshold of the distorted signal is larger than the zero voltage level, for example, but is stabilized to the judgment threshold of the zero voltage level by the automatic bias feedback control circuit as usual, so that the receiver unit deviates from the optimum reception of the digital signal and the sensitivity of the receiver unit is reduced.

US 2007/0264031A1 discloses that an MAC control unit of the optical line terminal utilizes the bandwidth allocation information to predict the power of next burst data packet and control the direct current bias of signal on the basis of the predicted power and uses direct current component and reversed direct current signal by charging and discharging of capacitor to cancel influence of the charging and discharging of capacitor, so that signal distortion is removed and the hardware setting time of the amplifier is shortened to improve the system efficiency. In this method, however, the prior-art limiting amplifier using AC coupling is used as usual and the judgment threshold thereof is decided by the automatic bias feedback control circuit, so that the direct current bias of signal is decided by the coupling capacitor (fixed to zero). Accordingly, the optimum reception cannot be maintained by making adjustment on the basis of signal waveform situation.

Furthermore, in this method, a parameter table for generating the direct current bias control signal is a fixed retrieval table. Accordingly, when the system is changed by the cause such as, for example, aging of element and variation in environmental temperature, parameters in the parameter table cannot be varied in accordance with the change, so that the burst receiver unit deviates from the optimum state and the sensitivity of the receiver unit is reduced.

Moreover, how to predict the signal power of an unregistered optical network unit at the time that the optical line terminal begins to transmit signals upon initialization of the system is not described. However, when the optical line terminal uses the relatively short hardware setting time, a registration request of such an unregistered optical network unit cannot be received successfully and it is difficult to register the optical network unit upon initialization of the system or upon recovery after interruption.

U.S. Pat. No. 6,715,113 discloses that a control signal based on an error code indication signal outputted from a forward error correction decoder is used to adjust the judgment threshold of the amplifier and the respective numbers of error codes of 0/1 and 1/0 are balanced to maintain the judgment threshold to be optimum and improve the sensitivity of the system. However, the forward error correction decoder and relatively long time to output the error code indication signal are required (for example, 20 µs) and accordingly it is very difficult for this method to complete feedback control within relatively short time, for example, within one tenth time (for example, 1 to 10 µs) from start of one burst data packet in the passive optical network.

SUMMARY OF THE INVENTION

In order to solve the above problem, the present invention provides an optical line terminal including a burst model optical receiver unit. The burst model optical receiver unit utilizes optimization of direct current bias for amplifier to shorten hardware setting time and maintain equivalent judgment threshold of amplifier to be optimum, so that the bandwidth efficiency and the sensitivity of the system can be improved at the same time. Furthermore, the optical line terminal stores variable direct current bias control parameter and variable hardware setting time parameter to provide the ability of flexible direct current bias control and normal initialization of the system.

According to a best embodiment of the present invention, an optical line terminal connected to a plurality of optical network units, comprises an optical network interface including an optical receiver unit to convert an optical signal received from the optical network unit into an electrical signal and receive a direct current bias control signal which controls a direct current bias to output a direct current bias monitoring signal which monitors the direct current bias and an error code detector to detect an error code in the electrical signal to output an error code indication signal, a storage to store therein a direct current bias table indicating a direct current bias corresponding to a direct current bias control parameter of the optical network units and a dynamic bandwidth allocation information table indicating communication time slot information allotted to each optical network unit, and a control unit to receive the direct current bias monitoring signal outputted by the optical receiver unit and the error code indication signal outputted by the error code detector and supply the direct current bias control signal to the optical receiver unit to thereby form one feedback circuit together with the optical network interface.

In the above configuration, the direct current bias control signal is preferably a signal calculated on the basis of the direct current bias monitoring signal and the error code indication signal received by the control unit, the direct current bias control parameter read out from the direct current bias table and the communication time slot read out from the dynamic bandwidth allocation information table in the storage.

In the above configuration, the error code detector is preferably a forward error correction decoder.

In the above configuration, the optical receiver unit preferably includes a photodiode to convert an optical signal received from the optical network unit into an electric signal, a trans-impedance amplifier connected to the photodiode to amplify the electrical signal outputted by the photodiode, a limiting amplifier connected to the trans-impedance amplifier through an AC coupling capacitor to perform limitation amplification to an output signal of the trans-impedance amplifier, a coupling capacitor connected between an output terminal of the trans-impedance amplifier and an input terminal of the limiting amplifier to realize AC coupling between the trans-impedance amplifier and the limiting amplifier, and a monitoring interface connected to the input terminal of the limiting amplifier to output a direct current bias monitoring signal on the basis of a signal inputted to the limiting amplifier. The input signal of the limiting amplifier is preferably a sum of the output signal of the trans-impedance amplifier and the direct current bias control signal.

In the above configuration, the direct current bias control parameter in the direct current bias table preferably contains user ID for identifying optical network unit, first and second voltage parameters and time constant and the communication time slot information in the dynamic bandwidth allocation information table contains user ID for identifying optical network unit and first and second time parameters.

Particularly, the direct current bias control signal outputted by the control unit is preferably increased from time indicated by the first time parameter corresponding to user ID in the dynamic bandwidth allocation information table and equal to the first voltage parameter corresponding to the same user ID in the direct current bias table in accordance with exponential relation determined by time constant corresponding to the same user ID in the direct current bias table to reach the second voltage parameter corresponding to the same user ID in the direct current bias table and is maintained to the value equal to the second voltage parameter until the second time parameter corresponding to user ID in the dynamic bandwidth allocation information table.

Furthermore, the control unit preferably minimizes an error code rate indicated by the error code indication signal to optimize the second voltage parameter in the direct current bias control parameters and minimizes difference between the direct current bias monitoring signal and the second voltage parameter to optimize the first voltage parameter in the direct current bias control parameters.

In the above configuration, the storage preferably stores therein hardware setting time parameter indicating hardware setting time corresponding to time necessary for setting optical receiver unit hardware of the optical line terminal in each optical network unit.

Particularly, the hardware setting time parameter is a first relatively long parameter value upon initialization of communication and after the optical line terminal completes registration process of the optical network unit and optimization process of the direct current bias control parameter, the optical line terminal preferably changes the hardware setting time parameter to a second relatively short parameter value and transmits the second parameter value to the optical network unit by means of hardware setting time message.

Moreover, there is provided an optical line transmission and reception system comprising an optical line terminal described in any of the present inventions and optical network units connected to the optical line terminal on the basis of the best embodiment of the present invention.

Particularly, in the optical line transmission and reception system, the optical line terminal is connected to the optical network units through tree-type topology links including a splitter and optical fiber and transmits hardware setting time message to the optical network unit through the links.

According to the present invention, the optical line terminal includes a burst model optical receiver unit. The burst model optical receiver unit utilizes optimization of direct current bias for amplifier to shorten hardware setting time and maintain equivalent judgment threshold of amplifier to be optimum, so that the bandwidth efficiency and the sensitivity of the system can be improved. Furthermore, the optical line terminal stores variable direct current bias control parameter and variable hardware setting time parameter to provide the ability of flexible direct current bias control and normal initialization of the system.

Other objects, features and advantages of the invention will become apparent from the following description of the embodiments of the invention taken in conjunction with the accompanying drawings.

BRIEF DESCRIPTION OF THE DRAWINGS

FIG. 3 is a block diagram illustrating an optical receiver unit used in the PON interface of the optical line terminal;

FIG. 4 is a diagram illustrating the principle of control and optimization of direct current bias (in case of AC coupling);

FIGS. 5A to 5I are diagrams roughly showing waveforms of data signal, direct current bias control signal and monitoring signal of the present invention and the prior art (in case of AC coupling);

FIGS. 6A to 6D show tables in storage of the optical line terminal of the present invention and the prior art;

FIG. 7 illustrates transmission of a hardware setting time message from the optical line terminal to the optical network unit;

FIG. 8 is a diagram showing the time sequence of messages of changing the hardware setting time;

FIGS. 16A to 16D are diagrams roughly showing waveforms of data signal, direct current bias control signal and monitoring signal of the present invention (in case of AC coupling).

DESCRIPTION OF THE EMBODIMENTS

An embodiment of the present invention is now described with reference to the accompanying drawings.

Embodiment 1

Figure 1:
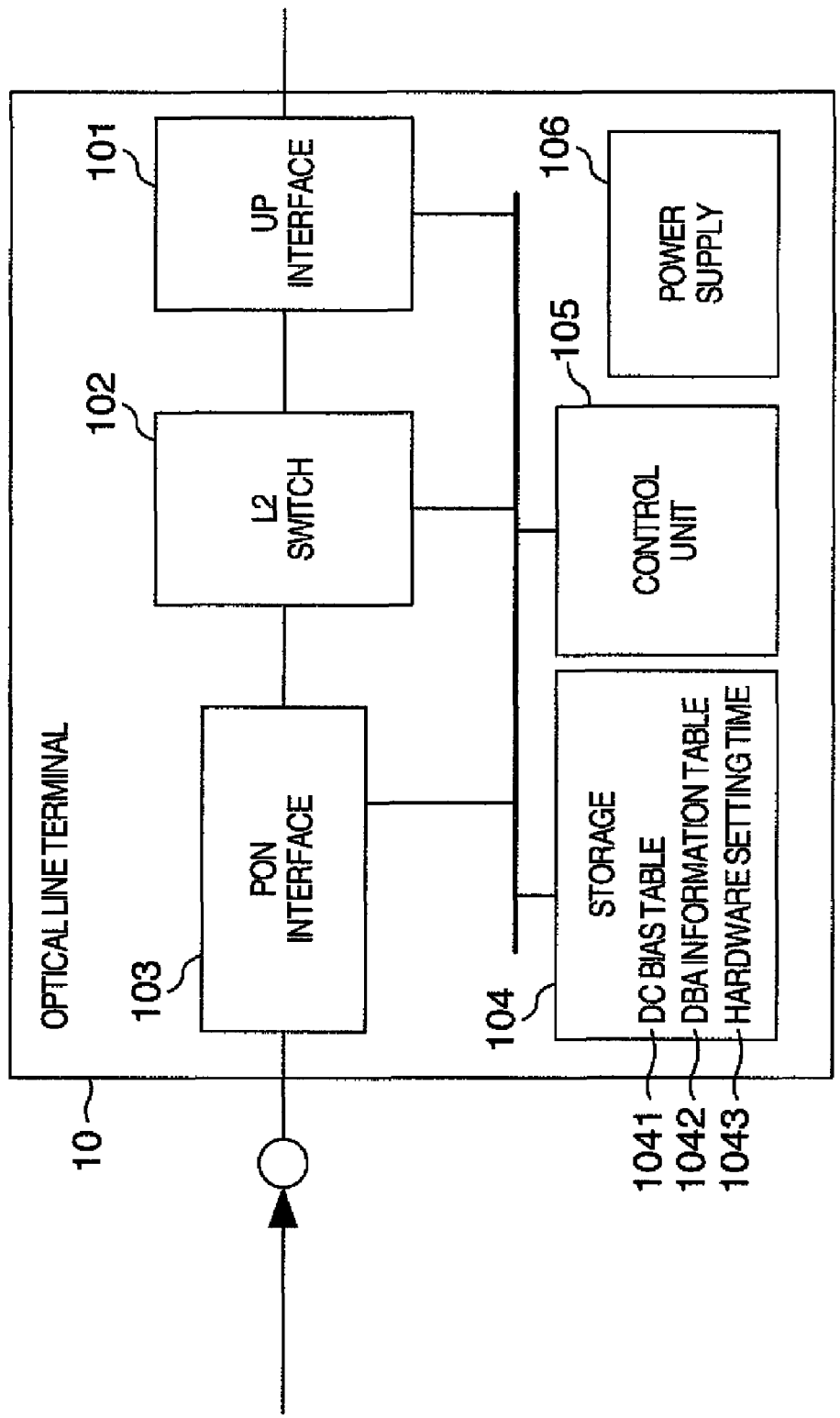
FIG. 1 is a block diagram schematically illustrating an optical line terminal according to an embodiment of the present invention.
Figure 2:
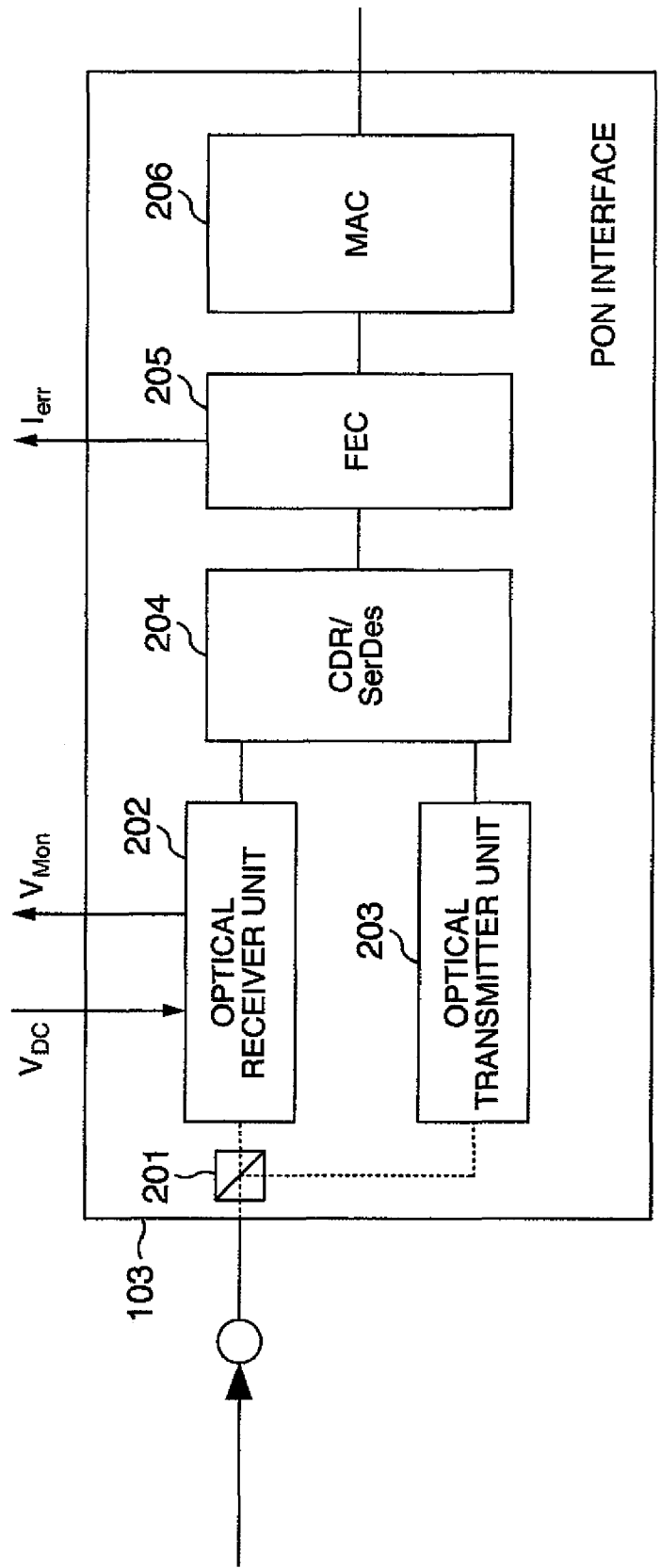
FIG. 2 is a block diagram illustrating a PON interface included in the optical line terminal of FIG. 1.

FIGS. 1 to 3 schematically illustrate an optical line terminal, a PON Interface and an Optical receiver unit, the PON interface and the optical receiver unit being included in the optical line terminal. As shown in FIG. 1, the optical line terminal 10 includes an up interface 101 for making communication with business side, a layer 2 switch 102 for exchanging up and down data, a PON interface (that is, network interface) 103 for making communication with optical network units connected to optical fiber links, a storage 104 for storing therein a direct current bias table 1041, a dynamic bandwidth allocation information table 1042 and a hardware setting time 1043, a control unit 105 for controlling operation of other modules (for example, output of direct current bias control signal, update of direct current bias table 1041 and the like) and a power supply 106 for supplying electric power.

As shown in FIG. 2, the PON interface 103 in the optical line terminal 10 includes a wavelength multiplexing member 201 for wavelength multiplexing up and down signals, an optical receiver unit 202 for photo-electrically converting the up signal received, an optical transmitter unit 203 for photo-electrically converting the down signal to be transmitted, a CDR/SerDes (clock data recovery/serialize deserialize) 204 for recovering clock and data and serializing/deserializing up and down signals, a forward error correction (FEC) decoder 205 for performing forward error correction operation and outputting an error code indication signal Ierr and a media access control (MAC) 206 for performing data processing of link layer. The optical receiver unit 202 receives a direct current bias control signal $V_{DC}$ supplied from the control unit 105 to adjust the direct current bias of signal on the basis of the direct current bias control signal $V_{DC}$, so that the adjusted signal is monitored to supply a direct current bias monitoring signal Vmon to the control unit 105.

As shown in FIG. 3, the optical receiver unit 202 in the PON interface 103 of the optical line terminal 10 includes a photodiode 301 for converting an optical signal into an electrical signal, a trans-impedance amplifier 302 for performing initial amplification to the converted electrical signal, a limiting amplifier 303 for performing limitation amplification to the amplified signal, a coupling capacitor 304 connected between the trans-impedance amplifier 302 and the limiting amplifier 303 to make AC coupling therebetween, a bias point 305 for superposing the direct current bias $V_{DC}$ on signal at an input terminal of the limiting amplifier 303 and a monitoring interface 306 for taking out the superposed signal to monitor it. The monitoring interface 306 takes out a direct current component Vmon of the superposed signal through a low-pass filter, for example, and supplies the direct current component Vmon to the control unit 105 as the direct current bias monitoring signal. In FIG. 3, an electrical signal Vsig1 in the up direction from the photodiode 301 and the trans-impedance amplifier 302 passes through the coupling capacitor 304 to be an electrical signal Vsig2. The signal Vsig2 is superposed on the direct current bias control signal $V_{DC}$ from the control unit 105 at the bias point 305 to be an input signal Vsig3 supplied to the limiting amplifier 303 (refer to a signal waveform roughly shown in FIG. 5). At the same time, the monitoring interface 306 monitors the signal Vsig3 and supplies the direct current bias monitoring signal Vmon to the control unit 105 through a low-pass filter, for example. The signal Vsig3 is amplified by the limiting amplifier 303 and then sent to the CDR/SerDes 204 (not shown).

FIG. 4 illustrates control and optimization of the direct current bias in the optical line terminal 10 theoretically (in case of AC coupling). In FIG. 4, the like elements to those shown in FIGS. 1 to 3 are designated by like reference numerals and description thereof is omitted.

As described with reference to FIG. 3, the elements in the optical receiver unit 202 subject the signal to photoelectric conversion, amplification, setting of direct current bias and limitation amplification and then the signal is sent to the CDR/SerDes 204. The CDR/SerDes 204 performs recovery and deserialization of clock and data and sends the obtained data signal to the FEC 205. The FEC 205 subjects the data signal to forward error correction decoding and transmits the decoded data signal to the MAC 206. The MAC 206 performs data processing of link layer and produces the error code indication signal Ierr to send it to the control unit 105. The control unit 105 is connected to the bias point 305 in the optical receiver unit 202 to output the direct current bias control signal $V_{DC}$ and is connected to the monitoring interface 306 in the optical receiver unit 202 to receive the direct current bias monitoring signal Vmon. The direct current bias monitoring signal Vmon is converted from analog signal or voltage into digital signal by an analog-to-digital (A/D) converter 1051 to be supplied to the control unit 105 and the direct current bias control signal $V_{DC}$ is converted from digital signal into analog signal or voltage by digital-to-analog (D/A) converter 1052 to be supplied to the bias point 305.

The control unit 105 is connected to the FEC 205 to receive the error code indication signal Ierr and is connected to the storage 104 to make reading and writing of the direct bias table 1041 and the DBA information table 1042. In this manner, the control unit 105, the bias point 305, the limiting amplifier 303, the CDR/SerDes 204, the FEC 205 and the monitoring interface 306 form one feedback circuit (refer to detailed circuit configuration of the optical receiver unit 202 in FIG. 3). The control unit 105 calculates the direct current bias control signal $V_{DC}$ on the basis of feedback signals, that is, the direct current bias monitoring signal Vmon, the error code indication signal Ierr and direct current bias control parameter and communication time slot information (refer to detailed table format of FIG. 6) read out from the direct current bias table 1041 and the DBA information table 1042 in the storage 104 (refer to the flow chart of control process in FIG. 9). The direct current bias control signal $V_{DC}$ is added to the data signal to change the direct current bias Vmon of the signal Vsig3 and change the number of error codes Ierr gotten by judgment of the limiting amplifier 303 and decoding of the FEC 205, so that Vmon and Ierr are supplied to the control unit 105 as feedback information to complete feedback control. At the same time, further, the control unit 105 optimizes the direct current bias control parameter on the basis of the above feedback information (refer to the flow chart of parameter optimization process in FIGS. 10 to 13) and writes the optimized direct current bias control parameter into the direct current bias table 1041 in the storage 104. The DBA information table 1042 in the storage 104 is obtained by normal dynamic bandwidth allocation processing of the control unit (refer to the standards IEEE 802.3ah).

FIGS. 5A to 5E roughly show waveforms of data signal, direct current bias control signal and monitoring signal of the present invention (in case of AC coupling). FIG. 5A shows the electrical signal Vsig1 outputted from the photodiode and the trans-impedance amplifier. Data of burst data packet exist during the period between Tstart and Tend and a protection time slot is formed between the burst data packet and last/next burst data packet. Since one data packet usually contains data having several thousand or more bits, only an envelope of the burst data packet is schematically shown in the drawing and concrete waveforms of individual bits are not shown.

After the signal passes through the coupling capacitor 304, the signal is distorted by charging and discharging of the capacitor as shown by the distorted signal Vsig2 in FIG. 5B. The coupling capacitor 304 is charged during the period from Tstart to Tend and the direct current component of Vsig2 is gradually reduced from the direct current component equal to Vsig1 to zero (loss in capacitor is neglected). At this time, the voltage across the coupling capacitor 304 is equal to a minus value of the direct current component of Vsig1. Thereafter, the direct current component of Vsig2 is maintained to zero until end of the burst data packet, that is, until Tend. After Tend, since Vsig1 is zero, the coupling capacitor 304 is discharged and Vsig2 is gradually reduced from the voltage across the coupling capacitor 304 to zero. When the next burst data packet is inputted, the above process is repeated.

In order to control the direct current bias of the signal to remove the signal distortion during the period from Tstart to Tend and control the direct current component of the signal during the period from Tstart to Tend to be an optimum value necessary for reception of digital signal, the control unit 105 supplies the direct current bias control signal $V_{DC}$ to the bias point 305 positioned after the coupling capacitor 304. The waveform of the direct current bias control signal $V_{DC}$ is as shown in FIG. 5C. During the protection time slot period, the signal $V_{DC}$ is equal to the direct current bias control parameter Vstart corresponding to the optical network unit which transmits the next burst data packet. The signal $V_{DC}$ is increased to reach the direct current bias control parameter Vend corresponding to the optical network unit in accordance with the exponential expression defined by the following expression (1), for example, and thereafter the signal $V_{DC}$ is maintained to be Vend until Tend.

$$V_{DC} = V\text{start} * \text{Exp}(T\text{start} - t)/tc \quad (1)$$

In the expression (1), tc is a previously set parameter (for example, 5 ns).

FIG. 5D shows the signal Vsig3 obtained by superposing the direct current bias control signal $V_{DC}$ on Vsig2. Since change of the direct current bias control signal $V_{DC}$ cancels out change of the direct current bias due to charging of the coupling capacitor 304, signal distortion of Vsig3 is removed as compared with Vsig2 and the direct current component of Vsig3 is maintained to Vend during the period from Tstart to Tend. This is equivalent to the fact that judgment threshold of the limiting amplifier is shifted by −Vend. In the drawings, Vstart and Vend are both minus values, although both of them are not limited thereto in actual application.

FIG. 5E shows the direct current bias monitoring signal Vmon outputted by the monitoring interface 306 through the low-pass filter. As described above, the direct current component of signal is maintained to be Vend during the period from Tstart to Tend. Accordingly, the direct current bias monitoring signal Vmon is also maintained to be Vend during this period.

FIGS. 5F to 5I roughly show waveforms of signals obtained by superposing the direct current bias control signal on the signal before the signal passes through the coupling capacitor 304 in the prior art. FIG. 5F shows an electrical signal $V_A$ outputted from the photodiode and the trans-impedance amplifier. $V_A$ is similar to Vsig1 and accordingly description thereof is omitted.

FIG. 5G shows a direct current bias control signal $V'_{DC}$ before superposing it on the coupling capacitor 304. Since the signal $V'_{DC}$ is maintained similarly to the direct current component of the next burst data packet signal during the protection period in the prior art, the charging process of the coupling capacitor 304 can be completed a little early and operation is maintained stably during the period from Tstart to Tend, so that the signal is not distorted. The signal $V'_{DC}$ is turned to zero since the burst data packet is reached, that is, from Tstart and maintained to zero until Tend.

Such a direct current bias control signal $V'_{DC}$ and the burst data packet signal $V_A$ are superposed on each other to get a composite signal $V_B$. The direct current component of the composite signal $V_B$ is not changed from end of last burst data packet to end of the burst data packet as shown in FIG. 5H. Accordingly, the direct current component of output signal $V_C$ which has passed through the coupling capacitor 304 reaches the stable state before Tstart. In other words, the direct current component of output signal $V_C$ reaches zero and is not changed during the period from Tstart to Tend as shown in FIG. 5I. This means that signal distortion in the period from Tstart to Tend is removed. However, as shown in the drawing, the direct current component of the finally obtained signal $V_C$ is only zero by the effect of isolation direct current component of the coupling capacitor 304 and it is equivalent to the fact that the judgment threshold of the limiting amplifier is only zero and this is disadvantageous to receive the optimum digital signal.

FIGS. 6A and 6B show the direct current bias table 1041 and the dynamic bandwidth allocation information table 1042 stored in the storage of the optical line terminal of the present invention. As shown in FIG. 6A, the direct current bias table 1041 includes a logic link identifier (LLID) for identifying the optical network unit and a direct current bias control parameter. The parameters include, for example, Vstart indicating a value which the direct current bias control signal $V_{DC}$ reaches during the protection time slot period, Vend which the direct current bias control signal $V_{DC}$ reaches during the stabilization period, a previously set time constant tc for deciding the rate that the direct current bias control signal $V_{DC}$ is increased from Tstart to Tend (it is previously set to 5 ns for electric capacitance of 100 pf and load of 50 ohm and refer to FIG. 5C), Nerr indicating the total number of error codes and a total count time Terr counted from starting to count error codes.

As shown in FIG. 6B, the dynamic bandwidth allocation information table 1042 includes the logic link identifier (LLID) for indicating the optical network unit and a dynamic bandwidth allocation parameter. The parameter includes, for example, start time Tstart and end time Tend of the time slot allocated to the optical network unit corresponding to the LLID.

FIGS. 6C and 6D show a parameter retrieval table and an optical network unit RSSI (remote signal strength indicator) table in the prior art. As shown in FIG. 6C, the parameter retrieval table includes power X indicating power of last burst data packet, power Y indicating power of the present burst data packet and connection parameter corresponding to the above two powers (refer to US 2007/0264031 A1). As shown in FIG. 6D, the optical network unit RSSI table includes optical network unit (ONU) and parameter indicating power corresponding to the optical network unit (refer to US 2007/0264031 A1). As compared with the parameter retrieval table of FIG. 6C, the direct current bias table of the present invention shown in FIG. 6A can be modified and is more flexible since optimization maintained during operation of the system is maintained to the optimum value.

FIG. 7 illustrates transmission of a hardware setting time message from the optical line terminal 10 to the optical network unit 40. In the passive optical network system, the optical line terminal 10 is connected to the optical network unit 40 through tree-type topology links composed of a splitter distributor 20 and optical fibers 30 and transmits the hardware setting time message 50 to the optical network unit 40 through the links.

FIG. 8 is a diagram showing the time sequence of transmitting the hardware setting time message from the optical line terminal 10 to the optical network unit 40. Upon initialization of the system or reconnection of the optical network unit 40, the optical line terminal 10 transmits a discovery message (step S900) to all of the optical network units 40 from a fixed periodical discovery window and at the same time the optical line terminal 10 and the optical network units 40 set the hardware setting time to a default value, for example, 800 ns (steps S901 and S902). After the optical network unit 40 receives the discovery message, the optical network unit 40 transmits a registration request to the optical line terminal 10 (step S903). The optical line terminal 10 performs normal registration process to the optical network unit 40 (refer to the standards IEEE 802.3ah) and transmits a registration message to the optical network unit 40 to notify that registration is successfully made (step S904). After the normal registration process is completed, the optical line terminal 10 and the optical network unit 40 utilize the hardware setting time set in steps S901 and S902 to make communication, while the optical line terminal 10 transmits a bandwidth allocation message to the optical network unit 40 and allots a time slot to the optical network unit 40 (step S905) to transmit up data and report to the optical line terminal 10 by the allotted time slot (step S906). Simultaneously therewith, the optical line terminal 10 subjects the direct current bias control parameters in the direct current bias table to optimization and adjustment (step S907 and refer to the flow chart of the parameter optimization process shown in FIGS. 10 to 13). After completion of the parameter optimization, the optical line terminal 10 updates the hardware setting time stored in the its own storage (step S908) and transmits a hardware setting time message contained in the updated hardware setting time to the optical network unit 40 (step S909). The optical network unit 40 updates, after the message is received, the hardware setting time stored in its own storage by the hardware setting time contained in the message (step S910).

The optical line terminal 10 and the optical network unit 40 communicate with each other using the default value of the new hardware setting time and in the meanwhile the optical line terminal 10 transmits a bandwidth allocation message to the optical terminal unit 40 to allot a time slot to the optical network unit 40 (step S911), so that the optical network unit 40 transmits up data and report to the optical line terminal 10 by the allotted time slot (step S912).

Figure 9:
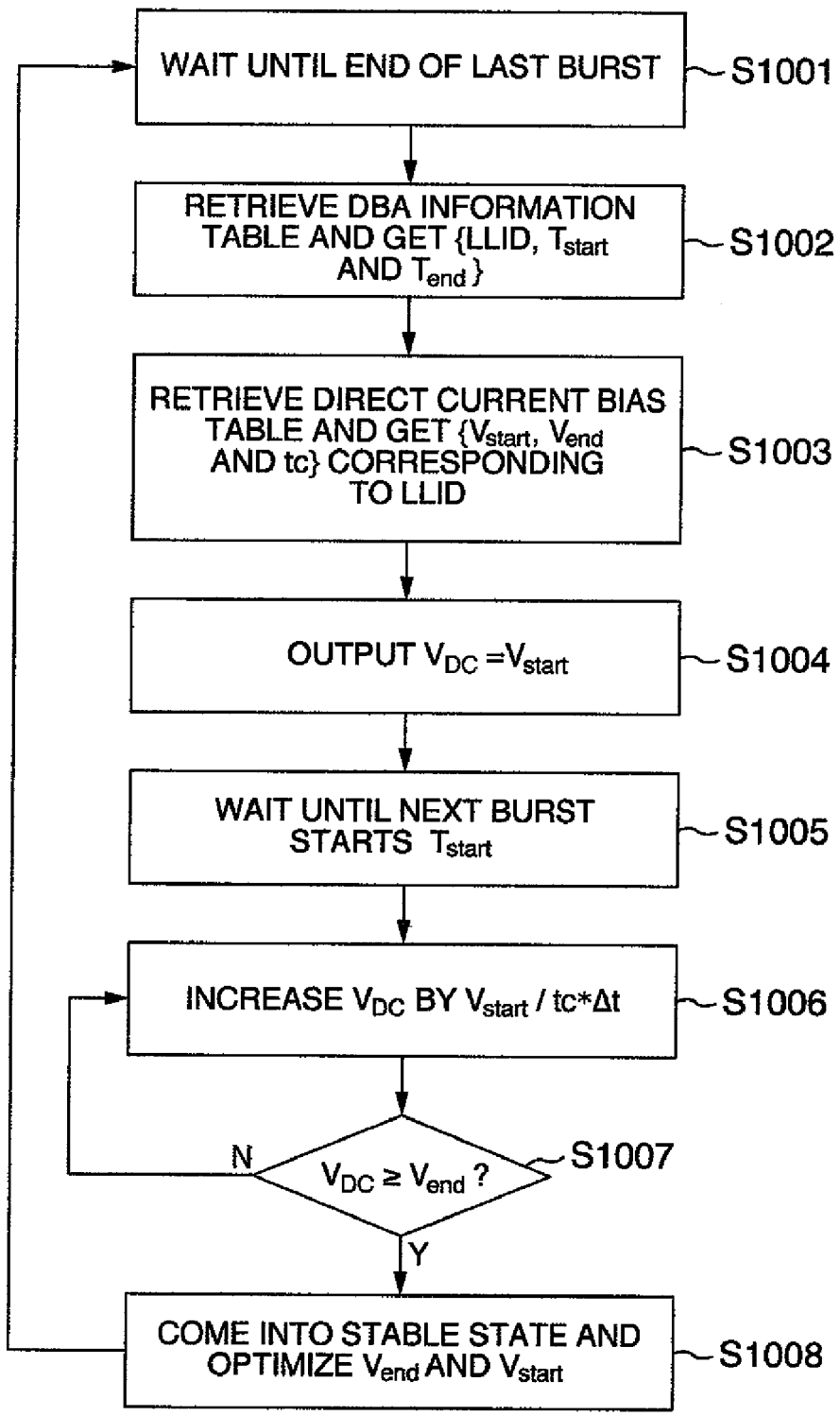
FIG. 9 is a flow chart showing processing operation of setting a direct current bias control signal by a control unit in the optical line terminal.

FIG. 9 is a flow chart showing processing operation of setting the direct current bias control signal $V_{DC}$ of the control unit 105 in the optical line terminal 10. When data in up direction is received, the optical line terminal 10 sets one burst data packet and last protection time slot as one process period. The optical line terminal 10 first waits for end of last period, that is, end of last burst data packet (step S1001) and then starts a new process period. At this time, the optical line terminal 10 retrieves the DBA information table 1042 and gets communication time slot information LLID, Tstart and Tend (step S1002) to thereby understand which optical network unit the burst data packet to be reached soon is transmitted from and its start time and end time. The optical line terminal 10 retrieves the direct current bias table 1041 and gets the direct current bias control parameters Vstart, Vend and tc corresponding to LLID (step S1003). Then, the optical line terminal 10 outputs the direct current bias control signal $V_{DC}$ equal to Vstart (step S1004) and waits for arrival of next burst data packet (step S1005). That is, the optical line terminal 10 waits for time for identifying Tstart obtained from the DBA information table 1042. The optical line terminal 10 increases $V_{DC}$ at step of Vstart/tc*Δt from Tstart (step S1006) and judges whether $V_{DC}$ is higher than or equal to Vend or not (step S1007). In step S1007, when the judgment result is no (N), the processing is returned to step S1006 and $V_{DC}$ is increased continuously. When the judgment result is Yes (Y), the optical line terminal 10 comes into stable state and Vend and Vstart are optimized until end time Tend of the burst data packet (refer to the parameter optimization flow chart shown in FIGS. 10 and 13) (step S1008). Thereafter, processing comes into next process period.

Figure 10:
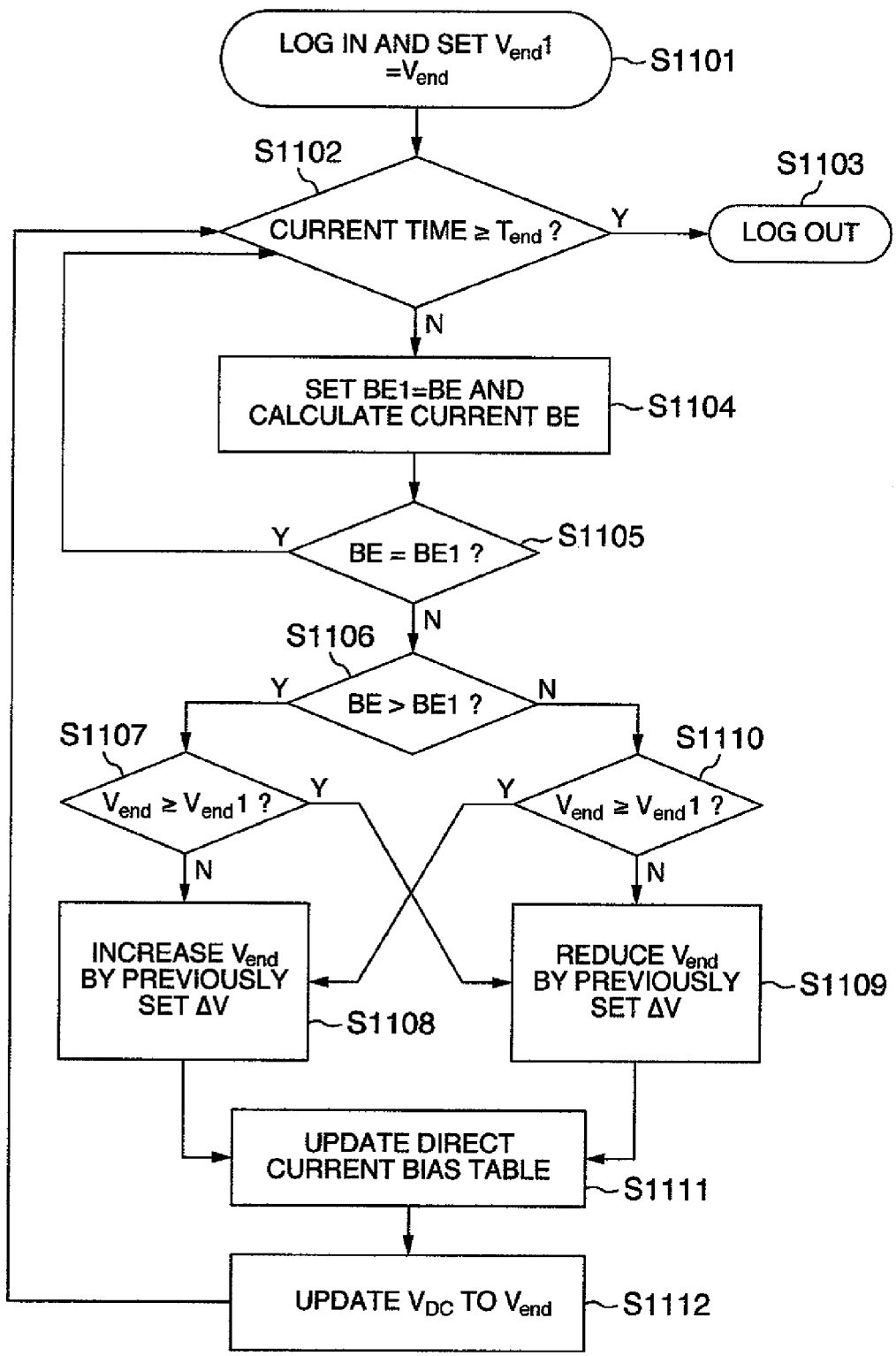
FIG. 10 is a flow chart showing processing operation of optimizing Vend by the control unit in the optical line terminal.

FIG. 10 is a flow chart showing processing operation of optimizing the direct current bias control parameter Vend by the control unit 105 in the optical line terminal 10. After the optical line terminal 10 comes into the stable state in step S1008 of FIG. 9, the optical line terminal 10 begins to optimize the direct current bias control parameters Vend and Vstart. First, the optical line terminal 10 comes into optimization process of Vend and sets a temporary variable Vend1 to be equal to Vend (step S1101). The optical line terminal 10 judges whether current time t is past the end time Tend of the current burst data packet or not (step S1102). In step S1102, when the judgment result is yes (Y), the optical line terminal 10 logs out from program (step S1103). When the judgment result is no (N), the processing proceeds to next step, in which temporary variable BE1 is set to be equal to error code rate BE and current error code rate BE is calculated and updated (refer to the flow chart of calculation of BE in FIG. 11) (step S1104). In step S1104, when the error code rate of the optical network unit is first calculated, BE and BE1 are both initialized to zero. The optical line terminal 10 judges whether current error code rate BE is equal to old error code rate BE1 or not (step S1105). In step S1105, when the judgment result is yes (Y), it shows that error code rate is not changed and the processing is returned to step S1102, so that the processing in steps S1102, S1104 and S1105 is performed continuously. When the judgment result is no (N), the processing proceeds to next step, in which it is judged whether current error code rate BE is larger than old error code rate BE1 or not (step S1106). Then, it is judged whether current parameter Vend is larger than old parameter Vend1 or not (step S1107 or S1110). In step S1106, when the judgment result is yes (Y), it shows that the error code rate is increased and in step S1107 when the judgment result is no (N), it shows that Vend is reduced, or in step S1106 when the judgment result is no (N), it shows that the error code rate is reduced and in step S1110 when the judgment result is yes (Y), it shows that Vend is increased, so that Vend is increased at previously set step of ΔV (step S1108). In step S1106 when the judgment result is yes (Y), it shows that the error code rate is increased and in step S1107 when the judgment result is yes (Y), it shows that Vend is increased, or in step S1106 when the judgment result is no (N), it shows that the error code rate is reduced and in step S1110 when the judgment result is no (N), it shows that Vend is reduced, so that Vend is reduced at previously set step of ΔV (step S1109). The optical line terminal 10 updates the direct current bias table 1041 on the basis of Vend obtained in step S1108 or S1109 (step S1111) and updates the direct current bias control signal $V_{DC}$ (step S1112). Thereafter, the processing of the optical line terminal 10 is returned to step S1102 and the processing from steps S1102 to S1112 is performed repeatedly.

Figure 11:
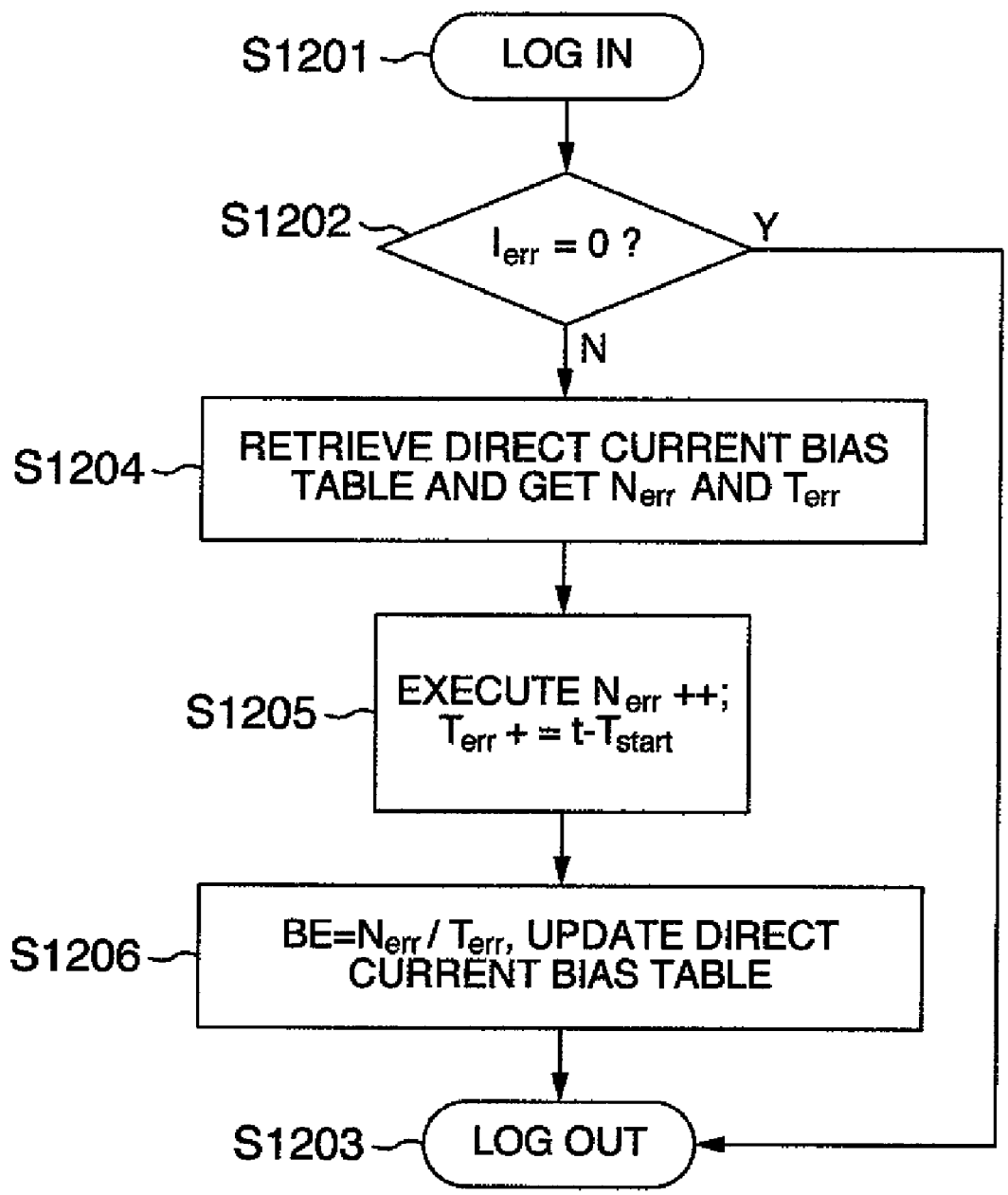
FIG. 11 is a flow chart showing processing operation of calculating BE by the control unit in the optical line terminal.

FIG. 11 is a flow chart showing processing operation of calculating BE by the control unit 105 in the optical line terminal 10. In step S1104 of FIG. 10, the optical line terminal 10 comes into the process of calculating the current error code rate BE (step S1201). First, the optical line terminal 10 examines whether the error code indication signal Ierr is zero or not (step S1202). In step S1202, when the judgment result is yes (Y), it shows that new error does not occur and the optical line terminal 10 logs out from program (step S1203). When the judgment result is no (N), the processing proceeds to next step, in which the direct current bias table 1041 is retrieved to get direct current bias control parameters Nerr and Terr corresponding to current optical network unit LLID (step S1204). Nerr represents the total number of error codes and Terr represents the total count time. Then, the optical line terminal 10 increases Nerr value by 1 and increases Terr value by t-Tstart (step S1205). The optical line terminal 10 calculates current error code rate BE=Nerr/Terr and updates Nerr and Terr in the direct current bias table 1041 (step S1206) and then logs out from step S1203.

Figure 12:
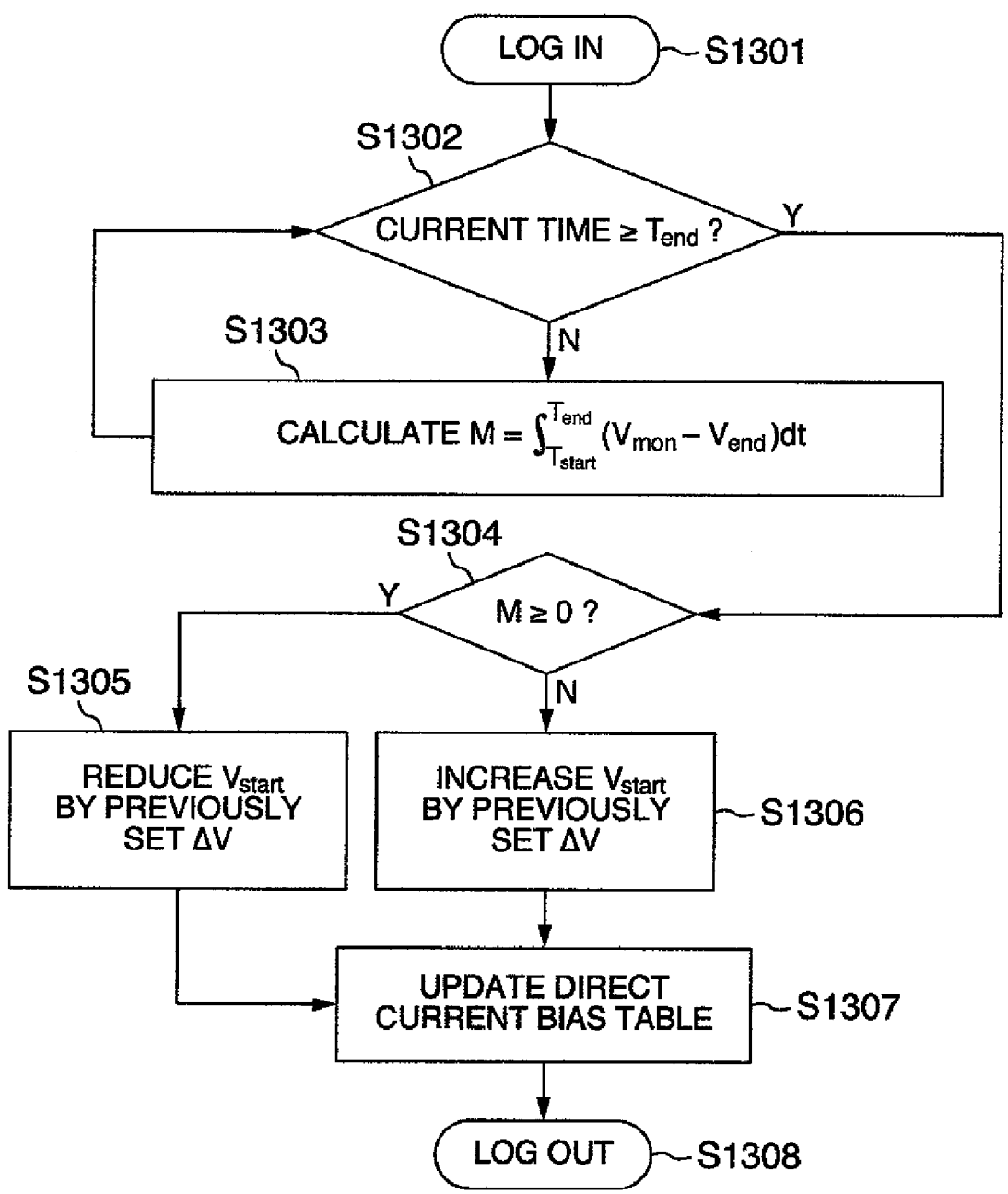
FIG. 12 is a flow chart showing processing operation of optimizing Vstart by the control unit in the optical line terminal.

FIG. 12 is a flow chart showing processing operation of optimizing the direct current bias control parameter Vstart by the control unit 105 in the optical line terminal 10. After the optical line terminal 10 comes into the stable state in step S1008 of FIG. 9, the optical line terminal 10 begins to optimize direct current bias control parameters Vend and Vstart. After the optical line terminal 10 comes into the optimization process of Vstart (step S1301), the optical line terminal 10 judges whether the current time t is past the end time Tend of current burst data packet or not (step S1302). In step S1302, when the judgment result is no (N), the following expression (2) is calculated (step S1303) and then the processing is returned to step S1302 so that processing of steps S1302 and S1303 is repeated. When the judgment result is yes (Y), the processing proceeds to next step and it is judged whether difference M between direct current component Vend of set signal and direct current component Vmon of detected signal is larger than or equal to 0 (step S1304). In step S1304, when the judgment result is yes (Y), Vstart is reduced at previously set step of ΔV (step S1305). When the judgment result is no (N), Vstart is increased at previously set step of ΔV (step S1306). The optical line terminal 10 updates direct current bias control parameters Vend and Vstart in the direct current bias table 1041 (step S1307) and logs out from the program.

$$M = \int_{Tstart}^{Tend} (Vmon - Vend) dt \qquad (2)$$

Figure 13:
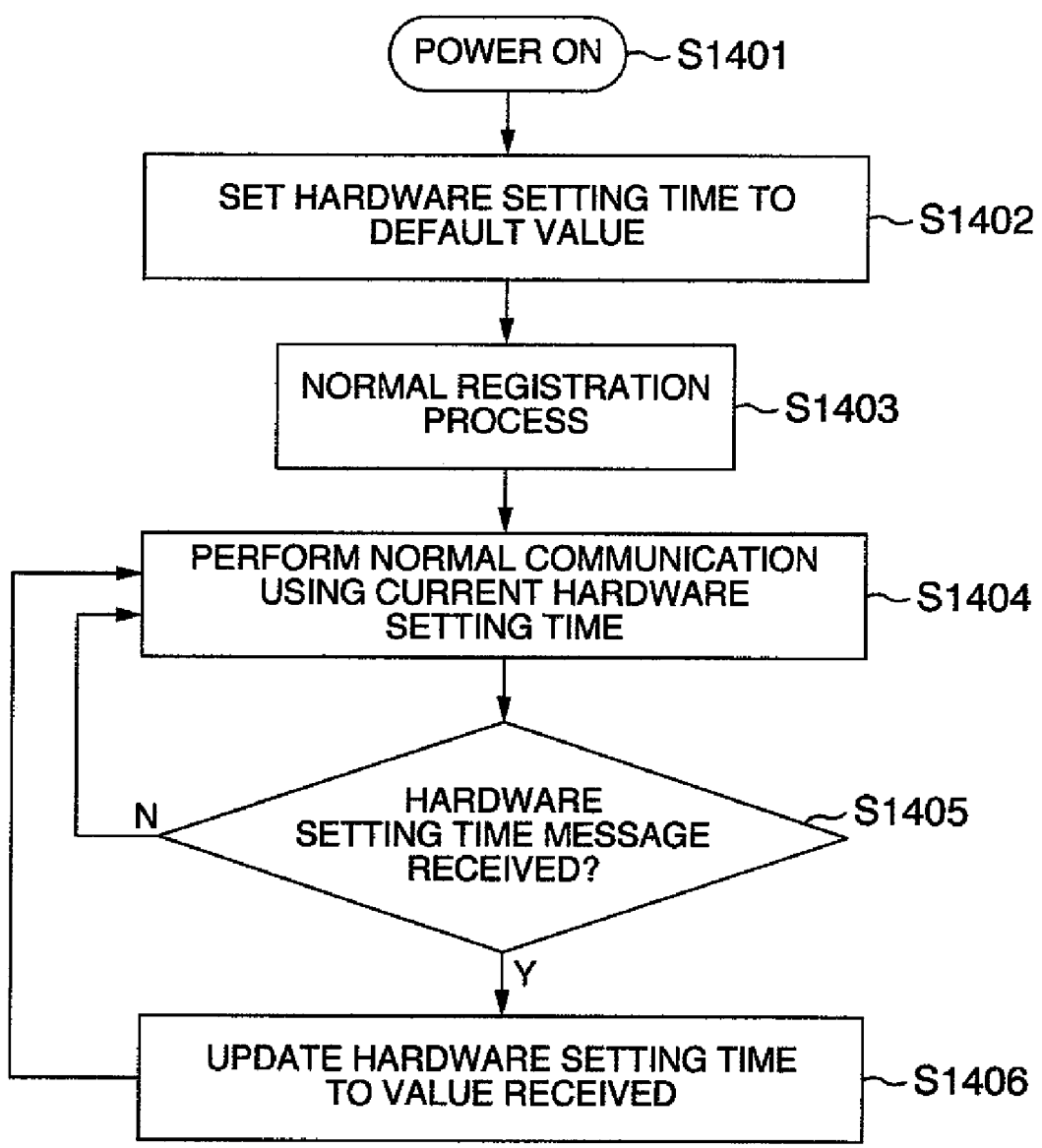
FIG. 13 is a flow chart showing processing operation of setting hardware setting time on the basis of a hardware setting time message by the control unit in the optical line terminal.

FIG. 13 is a flow chart showing processing operation of setting the hardware setting time on the basis of the hardware setting time message 50 by the control unit 105 in the optical network unit 40. After the optical network unit 40 is started by turning on the power supply (step S1401), the control unit 105 sets the hardware setting time to a default value, for example, 800 ns (step S1402) and then performs normal registration process (step S1403 and refer to the standards IEEE 801.3ah). After registration is completed, the optical network unit 40 uses the hardware setting time to perform normal communication with the optical line terminal 10 (step S1404). During communication, it is judged whether the optical network unit 40 receives the hardware setting time message 50 (step S1405). In step S1405, when the judgment result is no (N), it shows that the optical network unit 40 does not receive the hardware setting time message 50 and the processing is returned to step S1404, in which normal communication is performed continuously. When the judgment result is yes (Y), it shows that optical network unit 40 has received the hardware setting time message 50 and the hardware setting time is updated to hardware setting time contained in the received hardware setting time message 50 (step S1406). Then, the processing is returned to step S1404 and the updated hardware setting time is used to perform normal communication. In the communication process of the optical network unit 40, the processing from steps S1404 to S1406 is always maintained.

Figure 14:
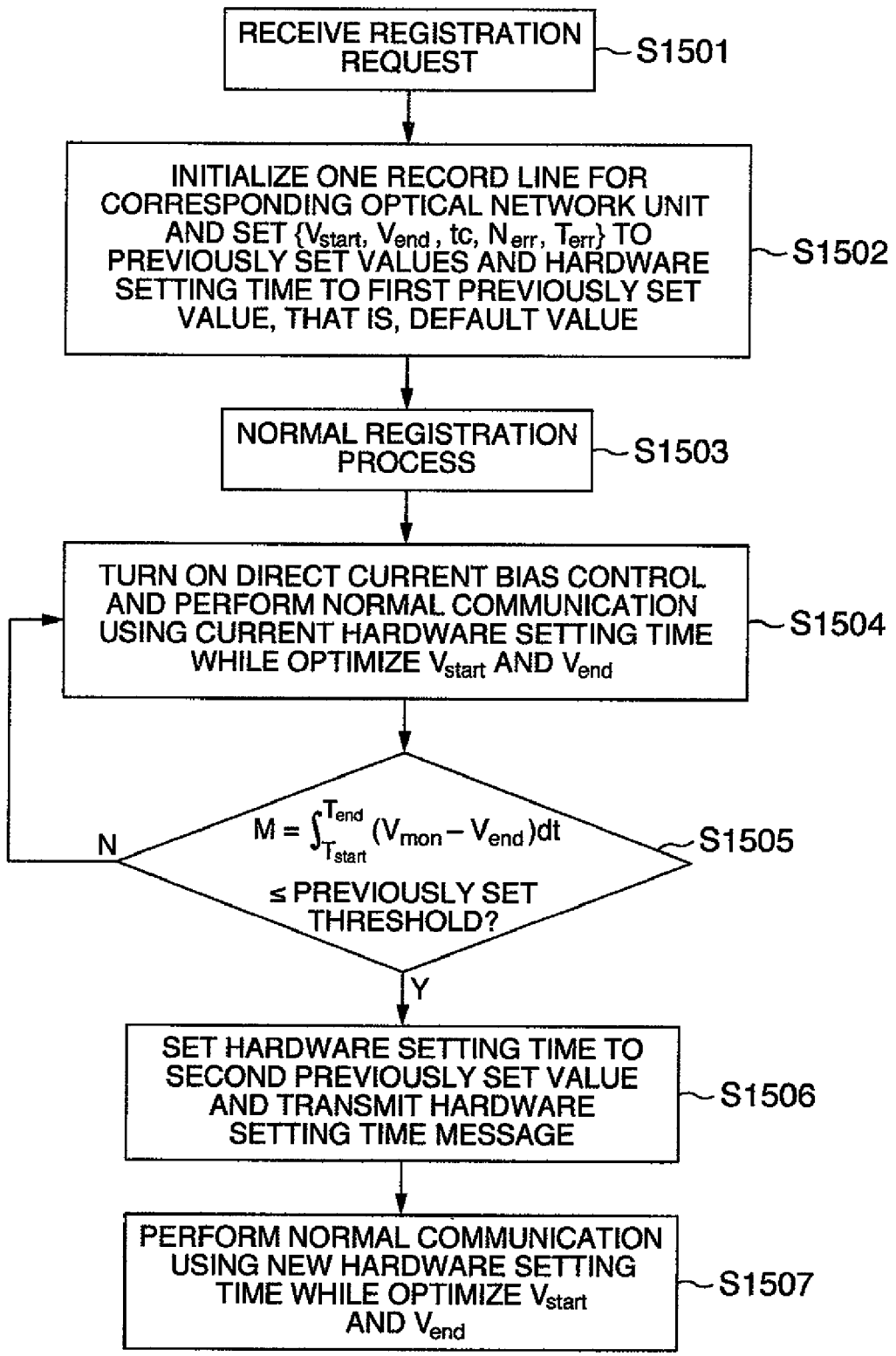
FIG. 14 is a flow chart showing processing operation of setting the hardware setting time and transmitting the hardware setting time message by the control unit in the optical line terminal.

FIG. 14 is a flow chart showing processing operation of setting the hardware setting time and transmitting the hardware setting time message 50 by the control unit 105 in the optical line terminal 10. When the optical line terminal 10 receives a registration request from the optical network unit 40 (step S1501) after the optical line terminal 10 starts the registration process, the control unit 105 initializes one record line for corresponding optical network unit in the direct current bias table 1041 and sets direct current bias control parameters Vstart, Vend, tc, Nerr and Terr to previously set values, for example, 0, 0, 5 ns, 0 and 0, respectively, and hardware setting time to first previously set value, that is, default value, for example, 800 ns (step S1502). The optical line terminal 10 and the optical network unit 40 complete normal registration process (step S1503). Then, the optical line terminal 10 performs normal communication with the optical network unit 40 by means of current hardware setting time in the state that direct current bias control is on and at the same time optimizes direct current bias control parameters Vstart and Vend (step S1504 and refer to the flow chart of parameter optimization process in FIGS. 10 to 13). After the parameter optimization is completed every time, the optical line terminal 10 judges whether M (calculated by the expression (2)) obtained in parameter optimization process is smaller than or equal to previously set threshold (step S1505). In step S1505, when the judgment result is no (N), the processing is returned to step S1504 and optimization is performed continuously until M is smaller than or equal to the threshold. When the judgment result is yes (Y), it shows that the parameter optimization reaches the stable state and the optical line terminal 10 changes hardware setting time to second previously set value, for example, 8 ns and transmits hardware setting time message 50 to the optical network unit 40 (step S1506). The hardware setting time message 50 contains updated hardware setting time. The optical line terminal 10 performs normal communication with the optical network unit 40 by means of new hardware setting time and at the same time optimizes direct current bias control parameters Vstart and Vend (step S1507 and refer to the flow chart of parameter optimization of FIGS. 10 to 13).

Embodiment 2

The embodiment 2 of the present invention is now described with reference to FIGS. 15 and 16. The block diagram of the optical line terminal, the principle diagram of control and optimization of direct current bias, the time sequence of message and the flow charts are similar to those of the embodiment 1 and accordingly description thereof is omitted for simplification of description. Description for the same elements is made using the same reference numerals as those of the embodiment 1.

Figure 15:
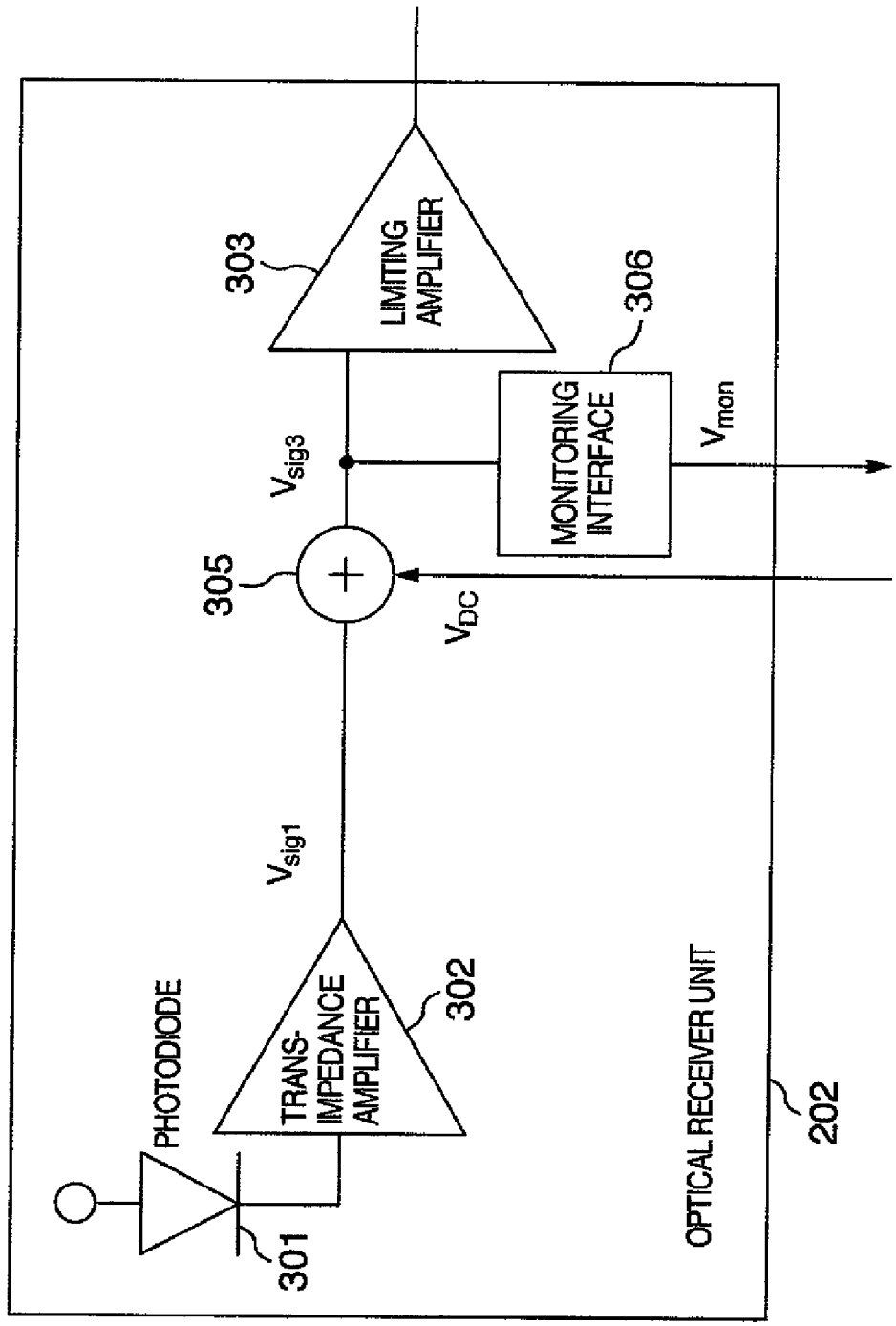
FIG. 15 is a diagram illustrating the principle of control and optimization of direct current bias (in case of AC coupling)

As shown in FIG. 15, the optical receiver unit 202 in the PON interface 103 of the optical line terminal 10 includes photodiode 301 for converting optical signal into electrical signal, trans-impedance amplifier 302 for performing initial amplification to the converted electrical signal, limiting amplifier 303 for performing limitation amplification to the amplified signal, bias point 305 for superposing the direct current bias $V_{DC}$ on signal at an input terminal of the limiting amplifier 303 and monitoring interface 306 for taking out the superposed signal to monitor it. In FIG. 15, the electrical signal Vsig1 in the up direction from the photodiode 301 and the trans-impedance amplifier 302 is superposed on the direct current bias control signal $V_{DC}$ supplied from the control unit 105 at the bias point 305 to be supplied as input signal Vsig3 to the limiting amplifier 303 (refer to signal waveforms roughly shown in FIG. 16). At the same time, the monitoring interface 306 monitors the signal Vsig3 and supplies direct current bias monitoring signal Vmon to the control unit 105 through low-pass filter, for example. The signal Visg3 is amplified by the limiting amplifier 303 and then sent to CDR/SerDes 204 (not shown).

Similarly, the signal passes through CDR/SerDes 204 and FEC 205 and is then supplied to MAC 206 to be subjected to link layer data processing. At the same time, error code indication signal Ierr is supplied to the control unit 105. The control unit 105, the bias point 305, the limiting amplifier 303, the CDR/SerDes 204, the FEC 205 and the monitoring interface 306 form one feedback control loop. The control unit 105 calculates the direct current bias control signal $V_{DC}$ on the basis of direct current bias monitoring signal Vmon, error code indication signal Ierr, direct current bias control parameter in direct current bias table 1041 and communication time slot information in DBA information table 1042 (refer to detailed table format of FIG. 6) (refer to the flow chart of control process of FIG. 9) and adds the obtained direct current bias control signal $V_{DC}$ to data signal. At the same time, the control unit 105 optimizes direct current bias control parameters on the basis of the feedback information described above (refer to the flow chart of parameter optimization of FIGS. 10 to 13) and writes the optimized direct current bias control parameter into direct current bias table 1041 in storage 104. The DBA information table 1042 in storage 104 is obtained by normal dynamic bandwidth allocation process of the control unit (refer to the standards IEEE 802.3ah).

Figure 16A:
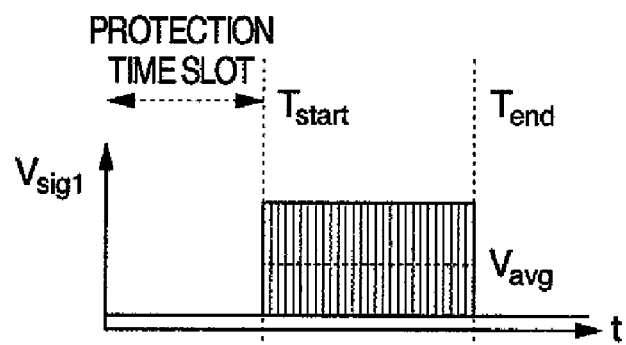
Figure 16B:
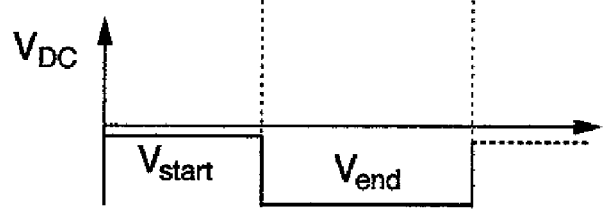

FIGS. 16A to 16D are diagrams roughly showing waveforms of data signal, direct current bias control signal and monitoring signal (in case of AC coupling). Similarly to that shown in FIG. 5A, FIG. 16A shows the electrical signal Vsig1 outputted from the photodiode and the trans-impedance amplifier. Data of burst data packet exist during the period between Tstart and Tend and protection time slot is formed between the burst data packet and last/next burst data packet. Direct current component of signal Vsig1 during burst data packet is Vavg.

In the embodiment, since DC coupling is adopted, the signal Vsig1 is superposed on direct current bias control signal $V_{DC}$ at bias point 305 directly. Waveform of direct current bias control signal $V_{DC}$ is as roughly shown in FIG. 16B. During the protection time slot period, the direct current bias control signal $V_{DC}$ is equal to direct current bias control parameter Vstart corresponding to the optical network unit which transmits next burst data packet and the direct current bias control signal $V_{DC}$ is maintained to Vend during the period from Tstart to Tend. Vstart approximates to zero and Vend approximates to −Vavg.

Figure 16C:
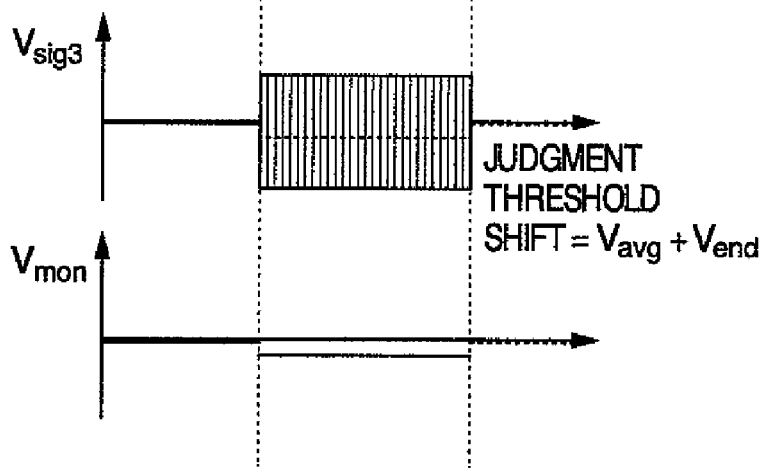

FIG. 16C shows the signal Vsig3 obtained by superposing the signal Vsig1 on the direct current bias control signal $V_{DC}$. Change of the direct current bias control signal $V_{DC}$ cancels out jump of direct current component of signal Vsig1 and accordingly direct current component of signal Vsig3 is always maintained to near zero. Particularly, the signal Vsig3 is equal to Vavg+Vend during the period from Tstart to Tend and this is equivalent to the fact that judgment threshold of the limiting amplifier is shifted by −(Vavg+Vend). In the drawing, Vstart and Vend are both minus values, although both of them are not limited thereto in actual application.

FIG. 16D shows the direct current bias monitoring signal Vmon outputted by the monitoring interface 306 through low-pass filter. As described above, since the direct current component of the signal is always maintained to Vavg+Vend during the period from Tstart to Tend, the signal Vmon is also maintained to be equal to Vavg+Vend during the period.

The present invention has been described concretely while referring to typical embodiments of the present invention, although it must be understood that various modifications in format and detailed parts may be made to the embodiments by those skilled in the art without departing from the spirit and scope of the invention restricted by the appended claims.

In the embodiments illustrative of the present invention, the burst receiver unit having the direct current bias optimization function according to the present invention is applied to the passive optical network, although the present invention can be applied to a burst receiver unit in the optical burst switch (OBS) network, a radio receiver unit in the radio communication system and a digital signal receiving system for receiving signal having signal width burst changed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical line terminal connected to a plurality of optical network units, comprising:

an optical network interface including: an optical receiver unit to convert an optical signal received from the optical network unit into an electrical signal and to receive a direct current bias control signal used to control a direct current bias to output a direct current bias monitoring signal used to monitor the direct current bias; and an error code detector to detect an error code in the electrical signal to output an error code indication signal;

a storage to store therein a direct current bias table indicating a direct current bias corresponding to a direct current bias control parameter of each optical network unit and a dynamic bandwidth allocation information table indicating communication time slot information allotted to each optical network unit; and a control unit to receive the direct current bias monitoring signal outputted by the optical receiver unit and the error code indication signal outputted by the error code detector, and to supply the direct current bias control signal to the optical receiver unit for monitoring the direct current bias control signal by the direct current bias monitoring signal to thereby form one feedback circuit together with the optical network interface wherein the direct current bias control signal is a signal calculated on the basis of the direct current bias monitoring signal and the error code indication signal received by the control unit, and the direct current bias control parameter read out from the direct current bias table and the communication time slot read out from the dynamic bandwidth allocation information table in the storage.

2. An optical line terminal according to claim 1, wherein the optical receiver unit includes:

a photodiode to convert the optical signal received from the optical network unit into the electric signal;

a trans-impedance amplifier connected to the photodiode to amplify the electrical signal outputted by the photodiode;

a limiting amplifier connected to the trans-impedance amplifier through an AC coupling capacitor to perform limitation amplification to an output signal of the trans-impedance amplifier;

a coupling capacitor connected between an output terminal of the trans-impedance amplifier and an input terminal of the limiting amplifier to realize AC coupling between the trans-impedance amplifier and the limiting amplifier; and a monitoring interface connected to the input terminal of the limiting amplifier to output the direct current bias monitoring signal on the basis of a signal inputted to the limiting amplifier;

the input signal of the limiting amplifier is a sum of the output signal of the trans-impedance amplifier and the direct current bias control signal.

3. An optical line terminal according to claim 1, wherein the error code detector is a forward error correction decoder.

4. An optical line terminal according to claim 1, wherein the direct current bias control parameter in the direct current bias table contains user ID for identifying the optical network unit, first and second voltage parameters and time constant and the communication time slot information in the dynamic bandwidth allocation information table contains user ID for identifying the optical network unit and first and second time parameters.

5. An optical line terminal according to claim 4, wherein the voltage of the direct current bias control signal outputted by the control unit equals to the first voltage parameter corresponding to the said user ID in the said direct current bias table at the said first time parameter corresponding to the same said user ID in the said dynamic bandwidth allocation information table, and is increased from said first time parameter time in accordance with exponential relation determined by time constant corresponding to the said user ID in the direct current bias table to reach the second voltage parameter corresponding to the same said user ID in the said direct current bias table and maintains the voltage equal to the said second voltage parameter until the said second time parameter corresponding to same user ID in the said dynamic bandwidth allocation information table.

6. An optical line terminal according to claim 4, wherein the control unit minimizes an error code rate indicated by the error code indication signal to optimize the second voltage parameter in the direct current bias control parameters and minimizes difference between the direct current bias monitoring signal and the second voltage parameter to optimize the first voltage parameter in the direct current bias control parameters.

7. An optical line terminal according to claim 1, wherein the storage further stores therein hardware setting time parameter indicating hardware setting time corresponding to time necessary for setting optical receiver unit hardware of the optical line terminal in each optical network unit.

8. An optical line terminal according to claim 7, wherein the hardware setting time parameter is a first relatively long parameter value upon initialization of communication and after the optical line terminal completes registration process of the optical network unit and optimization process of the direct current bias control parameter, the optical line terminal changes the hardware setting time parameter to a second relatively short parameter value and transmits the second parameter value to the optical network unit by means of hardware setting time message.

9. An optical line transmission and reception system comprising an optical line terminal according to claim 1 and optical network units connected to the optical line terminal.

10. An optical line transmission and reception system according to claim 9, wherein the optical line terminal is connected to the optical network units through tree-type topology links including a splitter and optical fiber and transmits hardware setting time message to the optical network unit through the links.

* * * * *